US008719556B2

(12) United States Patent
Mendes et al.

(10) Patent No.: US 8,719,556 B2
(45) Date of Patent: **\*May 6, 2014**

(54) SYSTEM AND METHOD FOR PERFORMING DETERMINISTIC PROCESSING

(75) Inventors: Paulo Mendes, Norwood, MA (US); Carlos Heil, Norwood, MA (US); Barry Edward Blancha, Boxborough, MA (US)

(73) Assignee: Bini Ate LLC, Boxborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/373,359

(22) Filed: Nov. 10, 2011

(65) Prior Publication Data

US 2012/0159131 A1 Jun. 21, 2012

Related U.S. Application Data

(63) Continuation of application No. 11/218,915, filed on Sep. 2, 2005, now Pat. No. 8,074,059.

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC ............................................. 712/227

(58) Field of Classification Search
None
See application file for complete search history.

(56) References Cited

U.S. PATENT DOCUMENTS

| | | | |
|---|---|---|---|
| 3,810,119 A | 5/1974 | Zieve et al. | |
| 4,733,353 A | 3/1988 | Jaswa | |
| 5,193,175 A | 3/1993 | Cutts, Jr. et al. | |
| 5,636,367 A | 6/1997 | Stones et al. | |
| 5,802,360 A | 9/1998 | Fernando | |
| 5,845,060 A | 12/1998 | Vrba et al. | |
| 5,987,598 A | 11/1999 | Levine et al. | |
| 6,230,263 B1 | 5/2001 | Ryan et al. | |
| 6,336,191 B1 | 1/2002 | Smolders et al. | |
| 7,134,003 B2 | 11/2006 | Watt | |
| 8,074,059 B2 | 12/2011 | Mendes et al. | |

FOREIGN PATENT DOCUMENTS

| | | | |
|---|---|---|---|
| JP | 3189823 A | 8/1991 | |
| JP | 4205028 A | 7/1992 | |
| JP | H05-73296 A | 3/1993 | |
| JP | 5233277 A | 9/1993 | |
| JP | 2000330785 A | 11/2000 | |

OTHER PUBLICATIONS

Chinese Office Action mailed Dec. 11, 2009 issued in corresponding Chinese Application No. 200600365837, 9 pages.
Cogswell et al., "Timing Insensitive Binary to Binary Translation of Real Time Systems"; 1994; Workshop on Architectures for Real-Time Applications; ISCA.

(Continued)

*Primary Examiner* — Corey S Faherty
(74) *Attorney, Agent, or Firm* — Lando & Anastasi LLP

(57) ABSTRACT

A system and method is provided for performing deterministic processing on a non-deterministic computer system. In one example, the system forces execution of one or more computer instructions to execute within a constant execution time. A deterministic engine, if necessary, waits a variable amount of time to ensure that the execution of the computer instructions is performed over the constant execution time. Because the execution time is constant, the execution is deterministic and therefore may be used in applications requiring deterministic behavior. For example, such a deterministic engine may be used in automated test equipment (ATE) applications.

17 Claims, 8 Drawing Sheets

(56) References Cited

OTHER PUBLICATIONS

Delvai M., et al.: "Processor Support for Temporal Predictability—The SPEAR Design Example," Real-Time Systems, 2003. Proceedings. 15th Euromicro Conference on Jul. 2-4, 2003, Piscataway, N.J., U.S.A, IEEE, Jul. 2, 2003, pp. 169-176, ISBN: 0-7695-1936-9.

Harmond, M. G., et al.: "A Retargetable Technique for Predicting Execution Time", Proceeding of the Real Time Systems Symposium. Phoenix, Dec. 2-4, 1992. Los Alamitos, IEEE Comp. Soc. Press, U.S., Dec. 2, 1992, pp. 68-77, ISBN: 0-8186-3195-3.

Peter Stuhlmuller: "16Bit Generation Z8000 Aufbau and Anwendung passage," 1980, pp. 2-17-2-22, Munchen ISBN: 3-921803-07-1.

Written Opinion of the International Searching Authority for International Application No. PCT/US2006/033511, 11 pages.

Intel Pentium II Application Notes—Using the RDTSC Instruction for Performance Monitoring; 1997; pp. 1-12.

CN—OA(02)23764122; 095131693; 1012125266001.

CN—OA Dec. 11, 2009—Appl No. 2006800365837.

SYSTEM AND METHOD FOR PERFORMING DETERMINISTIC PROCESSING

RELATED APPLICATIONS

This application is continuation of and claims priority under 35 U.S.C. §120 to U.S. patent application Ser. No. 11/218,915 entitled "SYSTEM AND METHOD FOR PERFORMING DETERMINISTIC PROCESSING," filed on Sep. 2, 2005, which application is herein incorporated by reference in its entirety.

BACKGROUND OF THE INVENTION

1. Field of the Invention

The invention relates generally to processing, and more specifically, to processing in non-deterministic computer systems.

2. Discussion of the Related Art

A key to success in an automated test system (ATE) is repeatability. Having a repeatable test system implies that the execution of a predefined test sequence on two identical devices produces identical results. Therefore, if stimuli applied to every device being tested is identical, the test outcome is a trustable source to be used in assessing the device quality. "Identical" stimuli not only mean that the moduli of any relevant test conditions (voltage, current, temperature, etc.) are the same but also the relative time when the test conditions are applied is the same.

Today, most test equipment in the ATE area involves one or more computer systems. It follows that a computer system that implements testing steps must generate these test steps in a deterministic way so that overall determinism is maintained. One problem with such a computer is cost—design of a complete computing system suitable for use in testing (e.g., one that produces consistent results) requires not only the expensive hardware design and maintenance but also expensive software design involving operating system, user interface, drivers, tools, etc. As a result, computer systems suitable for ATE are prohibitively expensive for most companies to purchase and maintain.

One way to reduce the cost of such systems includes using off-the-shelf computer components and systems. However, off-the-shelf general purpose computer systems are generally not suitable for such applications due to the deterministic requirements specified above. If a general-purpose computer system could be used in an ATE, the cost of ownership and operation of the ATE could be reduced.

SUMMARY OF THE INVENTION

According to one aspect of the present invention, a system for performing deterministic processing is provided. The system comprises a processing entity adapted to execute one or more instructions, and a component adapted to adjust a time of execution of the one or more instructions to be a constant value. According to one embodiment, the component is adapted to adjust the time of execution is adjusted to a maximum execution time of the one or more instructions. According to another embodiment, the component is adapted to adjust the time of execution of the one or more instructions to be a same constant value over multiple executions of the one or more instructions. According to another embodiment, the multiple executions occur on different computer systems. According to another embodiment, the different computer systems have different processing capabilities. According to another embodiment, the component is adapted to execution of the one or more instructions is performed within a predetermined time period. According to another embodiment, the component is adapted to wait a period of time to adjust the time of execution to the constant value.

According to one embodiment, the system further comprises a time reference, and wherein the component is adapted to determine relative time using the time reference. According to another embodiment, the component is adapted to determine relative time based upon a counter value of processor cycles. According to another embodiment, the time reference includes an interface, and wherein the component is adapted to obtain a counter of processing cycles through the interface. According to another embodiment, the component is adapted to determine an amount of time used to execute the one or more instructions, and is adapted to wait a period of time to adjust the time of execution to the constant value. According to another embodiment, the component is adapted to determine elapsed time based on a plurality of counter values. According to another embodiment, the counter value is a time stamp counter of a processor. According to another embodiment, the processor is a PENTIUM-type processor. According to another embodiment, the system is part of an automate test system.

According to one aspect of the present invention, a computer-implemented method for performing deterministic processing is provided. The method comprises acts of executing one or more instructions on a computer system, measuring an execution time of the act of executing, and waiting a period of time to adjust the execution time to a constant value. According to one embodiment, the act of waiting a period of time includes waiting for a period of time after the act of executing until the constant value of execution time has elapsed. According to another embodiment, the method further comprises acts of measuring an execution of the one or more instructions and determining, based on the act of measuring, a maximum execution time of the one or more instructions. According to another embodiment, the method further comprises an act of setting the constant value to the maximum execution time. According to another embodiment, the method further comprises an act of determining a maximum execution time of the one or more instructions. According to another embodiment, the method further comprises an act of setting the constant value to the maximum execution time.

According to one embodiment, the method further comprises an act of adjusting the execution time of the one or more instructions to be a same constant value over multiple executions of the one or more instructions. According to another embodiment, the multiple executions occur on different computer systems. According to another embodiment, the different computer systems have different processing capabilities. According to another embodiment, the method further comprises an act of performing the act of executing one or more instructions on a computer system within a predetermined time period. According to another embodiment, the method further comprises an act of waiting a period of time to adjust the execution time to the constant value. According to another embodiment, the method further comprises an act of determining relative time.

According to one embodiment, the method further comprises acts of providing a time reference and determining the relative time using the time reference. According to another embodiment, the method further comprises an act of determining the relative time based upon a counter value of processor cycles. According to another embodiment, the method further comprises acts of determining an amount of time used to execute the one or more instructions, and waiting a period of time to adjust the execution time to the constant value.

According to another embodiment, the method further comprises an act of determining elapsed time based on a plurality of counter values. According to another embodiment, the counter value is a time stamp counter of a processor. According to another embodiment, the processor is a PENTIUM-type processor. According to another embodiment, the method is performed by an automated test system.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
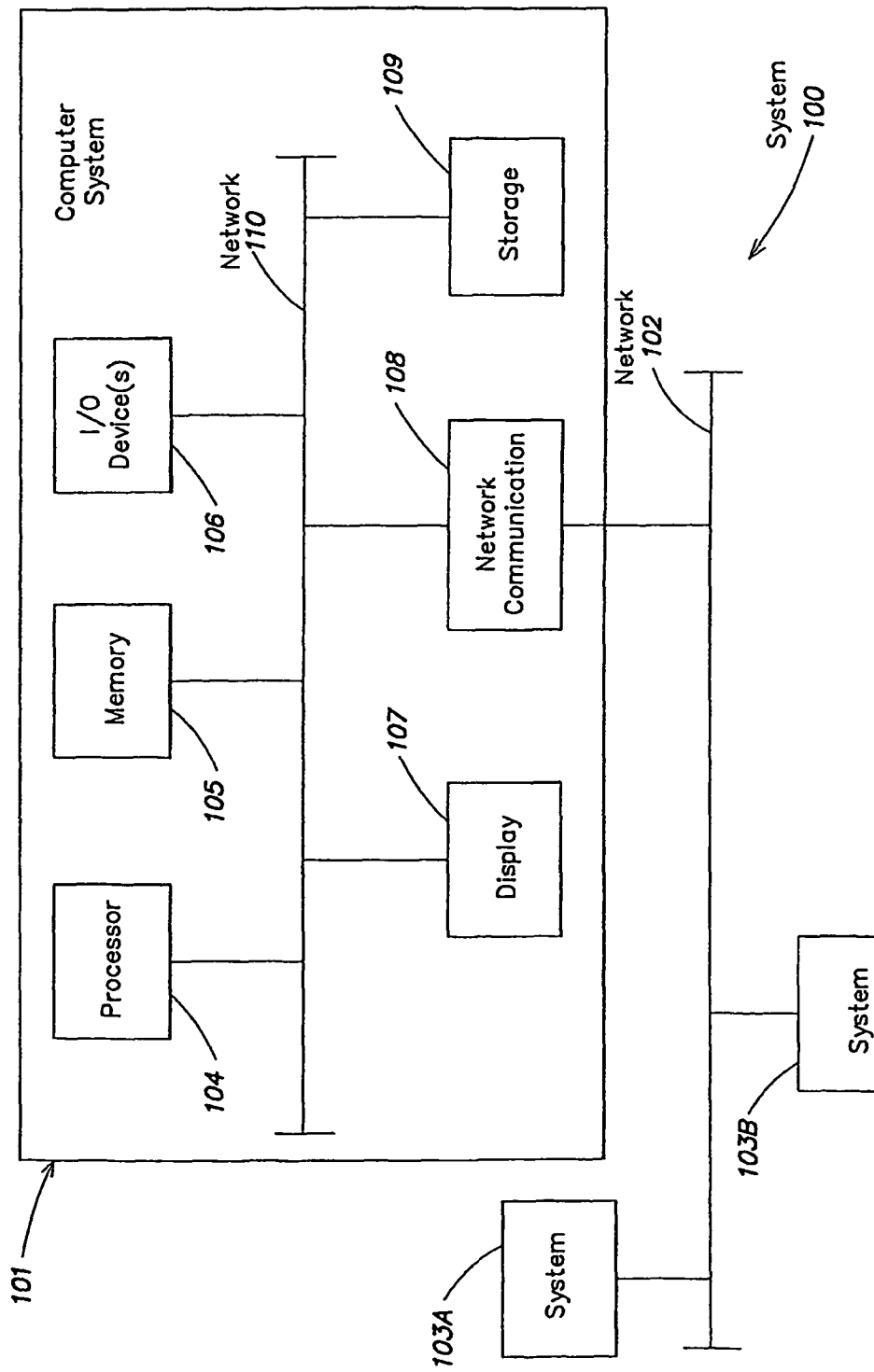
FIG. 1 shows an example computer system upon which various aspects of the present invention may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

A system and method is provided for performing deterministic processing. According to one aspect of the present invention, it may be beneficial to implement non-deterministic computer systems in a system that requires deterministic results. For instance, in an ATE system, it may be useful to implement general-purpose computer systems, processors, and/or software to reduce the cost of ownership and maintenance of such systems. In one example, a general-purpose computer system that implements an ATE system may be $1/10^{th}$ the cost of a specially-designed system. To this end, a method is provided to permit such non-deterministic systems to operate in a deterministic way.

According to one aspect of the present invention, it is appreciated that there are several aspects of a deterministic system such as an ATE system used by a test engineer:
(a) There is a relaxation point where the test engineer can reference as the reference time (e.g., time zero ($t_0$)) from which subsequent test steps are referenced;
(b) There is a deterministic test scheduler that starts test steps at predefined relative times referenced from the reference time ($t_0$).

Condition (a) is easy to meet using conventional systems and its implementation is generally trivial. For example, at reference time $t_0$, the device may be disconnected from stimuli and its temperature is set to room (handler) temperature. At the same time, at a test system, the test engineer can set the stimuli to a "start of test" (SOT) condition.

Condition (b), however, is more difficult to meet. In one example, a solution used to meet condition (b) may include a sequential circuit using a stable time reference to execute the test steps. If one designs a computer as a pure sequential circuit, then a program written for that computer is a sequencer, generating the test steps in a deterministic way. However, such a computer generally requires a specially-developed operating system and corresponding application programs to ensure that steps are performed in a deterministic way.

According to one aspect of the present invention, it is appreciated that if, for example, an attempt was made to meet condition (b) using an off-the-shelf computer, problems would result. In particular, it is appreciated that with general-purpose computer systems, their hardware and software design attempts to achieve maximum performance. In the case of execution of an ATE program, the general-purpose computer would attempt to complete all test steps as soon as possible, in any way possible. Rather, according to one aspect of the present invention, it is appreciated that condition (b) defines starting a new test step at a predefined time rather than as quickly as possible as is performed by current off-the-shelf computers and their associated software.

Current off-the-shelf computers achieve maximum performance using various mechanisms including, for example, cache memory, pipelines, multiple execution paths (exploratory execution), branch prediction, and other mechanisms. Most of these mechanisms make decisions based on educated guesses that depend on a historical and/or current context of the processor state. That is, based on a history (or pattern) of execution (e.g. data has been accessed, etc.), the next task steps are predicted (e.g., certain data is loaded into cache memory, what instructions are being decoded at each pipeline level, certain data is retrieved from disk, etc.). Of course, when a guess is wrong, there is a penalty in the performance and the task runs at a reduced speed. Further, such mechanisms generally operate differently at different runtimes, as such mechanisms depend on the performance of other programs and/or operating system state of the computer. As a result, most present-day techniques for increasing computer performance results in a computer system whose performance is difficult to predict and/or replicate due to the number of variables in the system, many of which are determined at runtime.

Because performance is difficult to predict, most ATE companies ignore condition (b) discussed above at system design time (as justified by the increased cost of design) and simply leave with the test engineer the problem of adjusting the test application until a satisfactory repeatability is achieved. Of course, meticulously tailoring the test application is a strategy to simulate condition (b), but this strategy is cumbersome and the resulting application is very fragile. Any change in the underlying computer hardware or software operating parameters or configuration can affect this custom tailoring, thus eliminating any deterministic operation.

Thus, a technique that results not only in a very repeatable system, but also in a system that is independent of the underlying computer hardware and software would be beneficial for deterministic applications such as an ATE system. It is realized, according to one aspect of the present invention, that if a maximum execution time can be predicted for a computer operation, the computer operation can be forced to operate in a deterministic way. More particularly, if the computer operation can be performed at the maximum execution time, the computer system's execution is predictable. In one example, the computer's execution of a particular operation may be delayed to ensure performance of the operation at the correct execution time.

According to one aspect of the present invention, a deterministic engine is provided for a general-purpose computer system. According to one embodiment, the deterministic engine can make the total execution time constant for any particular set of instructions. Provided that the desired total execution time is equal or greater than the maximum execution time, the total execution time can be set to a constant value. The maximum execution time can be determined either by analysis of the instructions involved (and thus measuring their maximum execution time) or empirically by execution the instruction set in different processor contexts.

Because a desired execution time is set as a constant value, the execution among different computer systems will be identical, assuming the actual execution time does not exceed the maximum execution time. As new processors having more capabilities and higher performance are introduced, the software applications utilizing such a deterministic engine can be ported to these new environments without eliminating the deterministic behavior. That is, because the desired execution time is greater than the maximum execution time on one particular computer system, any software application may be ported to a more capable computer system that may have a smaller maximum execution time for a particular set of instructions. In this way, software applications may perform deterministically when executed on different computer systems, and investment in application design is preserved between systems. For porting the application to less-capable or suspect systems, a verification may be performed to ensure that the designed maximum execution time is not exceeded.

General Purpose Computer System

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to perform deterministic processing according to various embodiments of the invention. Further, the system may be located on a single computer or may be distributed among a plurality of computers attached by a communications network.

A general-purpose computer system according to one embodiment of the invention is configured to perform any of the described deterministic functions, including but not limited to, performing test steps of a testing program. It should be appreciated that the system may perform other functions, including other applications requiring deterministic functions, and the invention is not limited to having any particular function or set of functions.

FIG. 1 shows a block diagram of a general purpose computer and network system in which various aspects of the present invention may be practiced. For example, various aspects of the invention may be implemented as specialized software executing in one or more computer systems including general-purpose computer system 101 shown in FIG. 1. Computer system 101 may include a processor 104 connected to one or more memory devices 105, such as a disk drive, memory, or other device for storing data. Memory 105 is typically used for storing programs and data during operation of the computer system 101. Components of computer system 101 may be coupled by an interconnection mechanism such as network 110, which may include one or more busses (e.g., between components that are integrated within a same machine) and/or a network (e.g., between components that reside on separate discrete machines). The interconnection mechanism enables communications (e.g., data, instructions) to be exchanged between system components of system 101.

Computer system 101 also includes one or more input/output (I/O) devices 106, for example, a keyboard, mouse, trackball, microphone, touch screen, a printing device, display screen, speaker, etc. In addition, computer system 101 may contain one or more interfaces (e.g., network communication device 108) that connect computer system 101 to a communication network (in addition or as an alternative to the network 110.

The storage system 109, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 109, as shown, or in memory system 105. The processor 104 generally manipulates the data within the integrated circuit memory 104, and then copies the data to the medium associated with storage 109 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architectures or components that that shown in FIG. 1.

Computer system 101 may be a general-purpose computer system that is programmable using a high-level computer programming language. Computer system 101 may be also implemented using specially programmed, special purpose hardware. In computer system 101, processor 104 is typically a commercially available processor such as the well-known Pentium class processor available from the Intel Corporation. Many other processors are available.

Such a processor usually executes an operating system which may be, for example, the Windows-based operating systems (e.g., Windows NT, Windows 2000 (Windows ME), Windows XP operating systems) available from the Microsoft Corporation, MAC OS System X operating system available from Apple Computer, the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network, unless specified by one or more claims. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, assembly language, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within system 100. For instance, the system may be a single or multiprocessor system. In one example, the system includes software processes executing on a system such as a personal computer (PC). Such a system, for example, may permit the user to perform one or more functions that require deterministic behavior. Such systems may include, for example, test systems, control systems, systems used in the aerospace industry, among others.

Example System Architecture

Figure 2:
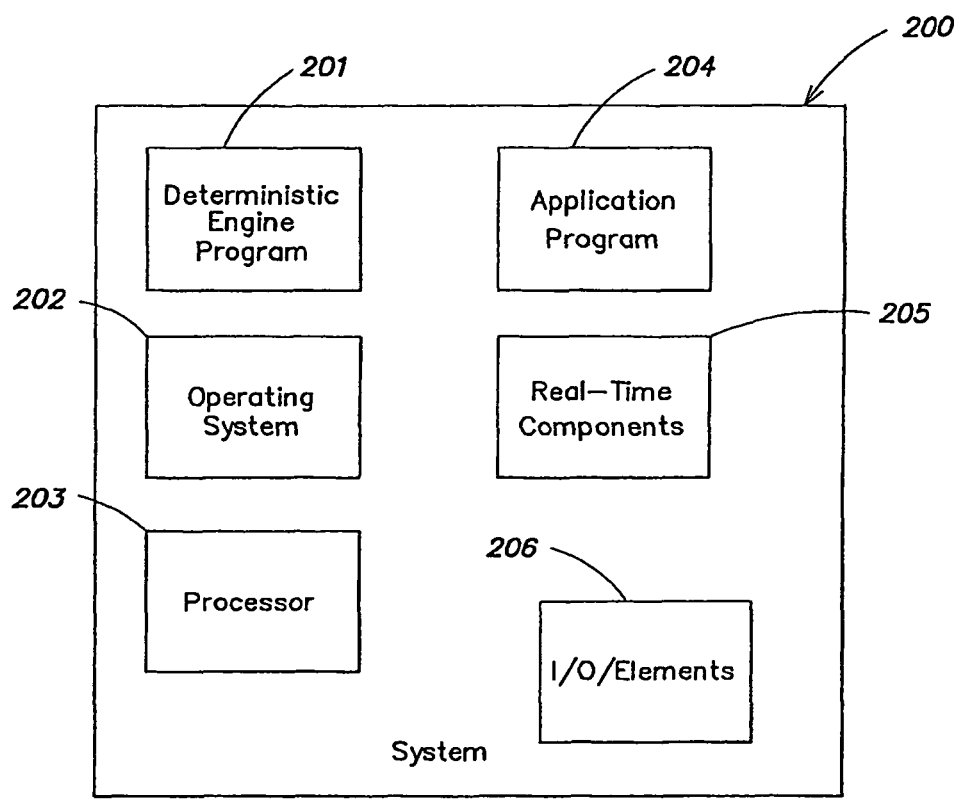
FIG. 2 shows an example system architecture according to one embodiment of the present invention.

FIG. 2 shows an architecture diagram of an example system according to one embodiment of the invention. It should appreciated that FIG. 2 is used for illustration purposes only, and that other architectures may be used to facilitate one or more aspects of the present invention.

As shown in FIG. 2, a computer system 200 (e.g., a general-purpose computer system as described above with reference to FIG. 1) may be used to implement a deterministic system. Computer system 200 may include a deterministic engine program 201 that permits an application program 204 to operate in a deterministic way. According to one embodiment of the present invention, system 200 need not be a deterministic system, but may be a general-purpose computer system as discussed above with reference to FIG. 1. To this end, system 200 may include an operating system 202, one or more processors 203, and one or more I/O components 206. Optionally, computer system 200 may include a real-time operating system and/or include real-time components 205 that assist application programs in operating in real time. Such real-time components include, for example, the INtime real-time programming extensions commercially available from the TenAsys Corporation, Beaverton, Oreg.

A deterministic engine according to one embodiment of the present invention provides a stable time reference for determining when operations are executed on computer system 200. Further, the deterministic engine program may provide indications to other programs and indicate when operations should be executed.

As discussed above, the maximum execution time may be determined for a particular operation or set of operations (e.g., computer instructions). The maximum execution time may be determined, for example, by direct measurement of the execution of the operations (e.g., determined over many executions) or may be determined heuristically using known methods. If the maximum execution time is not exceeded by execution of the operations by a computer system (e.g., computer system 200), then the computer system can be forced to operate in a deterministic manner.

To determine a solution implementing the above concept, consider an operation as being any computer task that can be repeated an arbitrary number of times and one whose execution time can be measured.

The following theorem is proposed:

If an operation execution is upper bounded in time then it is possible to force operation execution to a fixed execution time.

Proof: Let O denote an operation. Because the operation O is repeatable, $T_o(n)$ may be defined as the time the operation O takes to execute at the $n^{th}$ run. The theorem assumes that the operation O is upper bounded in time, then there exists $T_{max}$ such that the following equation is true:

$$T_o(n) \leq T_{max} \qquad (1)$$

Now suppose that an operation may be defined, referred to hereinafter as the operation waste, which has its execution time defined by the following equation $$W(n) = [T_{max} - T_o(n)] + E \qquad (2)$$

Here, the value E is an intrinsic error (e.g., overhead) caused when the operation waste executes. If a computer system can execute the operation waste every time the original operation executes, the combined execution time is now a constant value:

$$T_o(n) + W(n) = T_{max} + E \qquad (3)$$

The theorem above can be implemented as an operation with the properties described. That is, an operation may be defined that wastes time such that the combined execution is a constant value. Thus, it is possible to execute an operation deterministically on a non-deterministic system such as, for example, a general-purpose computer system, as the execution time is constant and therefore, predictable.

Figure 3:
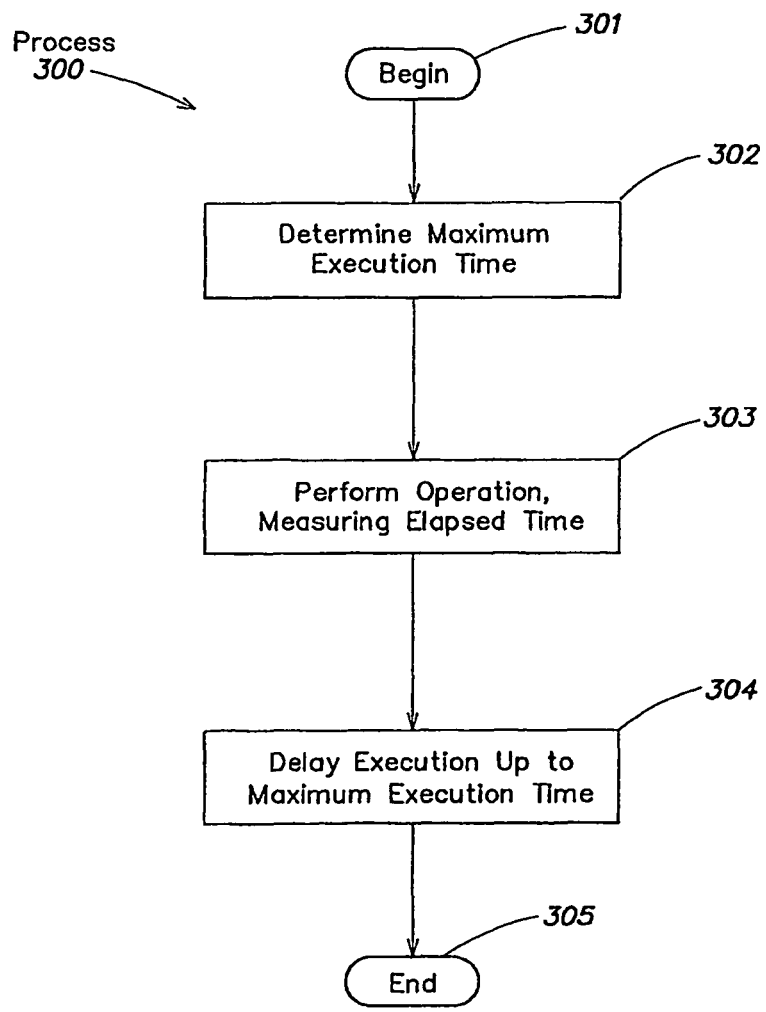
FIG. 3 is a process for performing deterministic processing according to one embodiment of the present invention.

Thus, if the execution time of a set of operations can be bounded within a fixed execution time period, the execution can be predictable and thus repeatable. FIG. 3 shows an example process 300 for performing deterministic processing according to one embodiment of the present invention wherein overall execution time is held constant. At block 301, process 300 begins. At block 302, the maximum execution time is determined. For example, the maximum execution time of one or more operations may be determined by measurement, heuristically, etc. At block 303, the one or more operations are executed, and a measurement is performed of the elapsed time. At block 304, a deterministic engine delays up to the determined maximum execution time such that the total execution time for the operations is a constant value. At block 305, process 300 ends.

As discussed above, a stable time reference is provided by the deterministic engine program so that elapsed time can be measured. According to one embodiment, the deterministic engine program may determine time based on information provided by a processor or other element of the computer system upon which the deterministic engine executes. In one example, the deterministic engine executes an Intel-based general purpose computer system incorporating the well-known PENTIUM-type processor. For example, the CPU instruction RDTSC (read timestamp counter) introduced with the PENTIUM class of processors reads the number of clock cycles passed since the processor was last reset. The timestamp counter is 64 bits wide, providing enough data to count for more than the computer lifetime (at 1.0 GHz the timestamp counter rolls over after more than 584 years).

If a computer program (e.g., a deterministic engine) reads the timestamp counter before and after the area of code under analysis, the difference between the two measurements provides the total number of CPU clock cycles spent executing the code in question. The only problem remaining is to determine how this number of clock cycles relates to time. Assuming k is the number of clock cycles spent to execute operation O, the following equation determines the time to execute that operation:

$$T_o = \frac{k}{f_{cpu}} \quad (4)$$

Here, $f_{cpu}$ is the CPU clock frequency. Unfortunately, there is no CPU instruction to retrieve the CPU clock frequency, so a method may be developed to provide this value.

Measuring the CPU Frequency

In one example, the programmable timer has a known and fixed count frequency of 1.1931817 MHz. If a computer program can read the timer counter before and after an operation, it is possible to determine the execution time of the executed operation. Let $k_t$ be the number of timer counts spent executing the operation O, then the time to execute that operation is measured by:

$$T_o = \frac{k_t}{1193181.7} \quad (5)$$

If both methods described are applied to the same operation O, the execution time $T_o$ is exactly the same and leads to the following equality:

$$\frac{k}{f_{cpu}} = \frac{k_t}{1193181.7} \quad (6)$$

Finally, $$f_{cpu} = 1193181.7 \cdot \frac{k}{k_t} \quad (7)$$

Based on the discussion above, it becomes possible to implement the example operation waste W(n) described above in equation (2):
(a) Read and save the timestamp counter;
(b) Execute operation O;
(c) Add to the saved timestamp counter the number of clock cycles equivalent to $T_{max}$. This value may be referred to as $k_{end}$;
(d) Read the timestamp counter;
(e) Loop to (d) while the value of the timestamp counter is less than $k_{end}$.
Note that:
The error E presented by equations (2) and (3) is due to steps (a), (c), (d) and (e);
The steps (d) and (e) take some time to execute, so this loop can cause a variation (loop error) in the error E;
The sequence (a)-(e) is referred to herein as the deterministic operation $O_D$;
The operations (a) and (c)-(e) are referred to herein as the deterministic envelope or functions performed by the deterministic engine.

Figure 4:
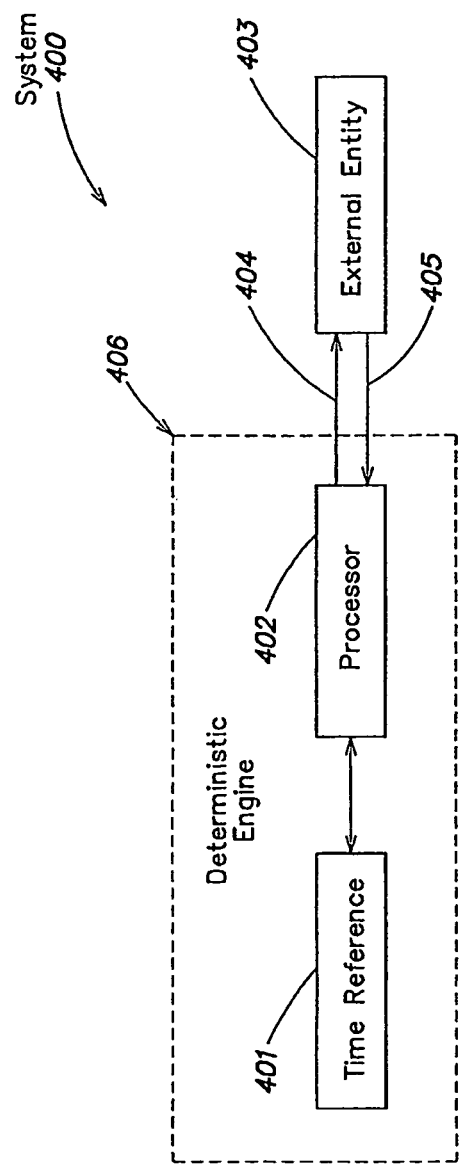
FIG. 4 is a block diagram of an example deterministic engine according to one embodiment of the present invention.

FIG. 4 shows one example of a system 400 used to perform deterministic processing according to one embodiment of the present invention. More particularly, system 400 includes a deterministic engine 406 that may implement one or more of the operations discussed above. System 400 includes a deterministic engine 406 and an external entity 403. External entity 403 may be, for example, hardware and/or software components (e.g., an application) that use the deterministic engine to make one or more operations perform in a deterministic way.

Deterministic system 406 includes a time reference 401 and a processor 402. Time reference 402 performs a time keeping operations. Processor 402 may include, for example, a software program executing on a general purpose computer system that performs one or more functions of deterministic engine 406. Engine 406 may accept and/or provide indications to facilitate keeping the maximum execution time at a constant value. To this end, processor may provide one or more indications 404 to external entity 403. Similarly, external entity 403 may provide one or more indications 405 to processor 402.

In the example implementation as shown in FIG. 4, time reference 401 is provided for keeping track of the passing of time. Time reference 401 may also provide a value that (directly or indirectly) correlates to a distance in time from a known event. This value continuously varies as time goes by. This value is referred to herein as the time count.

Also, a mathematical function may be used that plots time units against variations in the time count. In other words, given the difference between any two values of the time count, this mathematical function indicates how much time has passed between the two moments the two time count values were obtained. This mathematical function is referred to hereinafter as the delta time function.

Given a particular implementation of the time reference and of a delta time function, there is maximum time span associated with the difference between any two consecutive values of the time count. This maximum time span is referred to hereinafter as the time reference resolution.

In one example, time reference 401 provides an interface to external entities. The interface allows the processor to obtain the value of the time count from the time reference. When the processor requests a time count from the time reference, there may be a delay between the issuance of the request by the processor and the receipt of the time count by the processor system. This delay is referred to herein as the interface delay. The interface delay, according to one embodiment, is predictable for any implementation of the interface. For any particular implementation of the interface, the difference between the minimum and maximum interface delay is referred to as the interface jitter.

Figure 5:
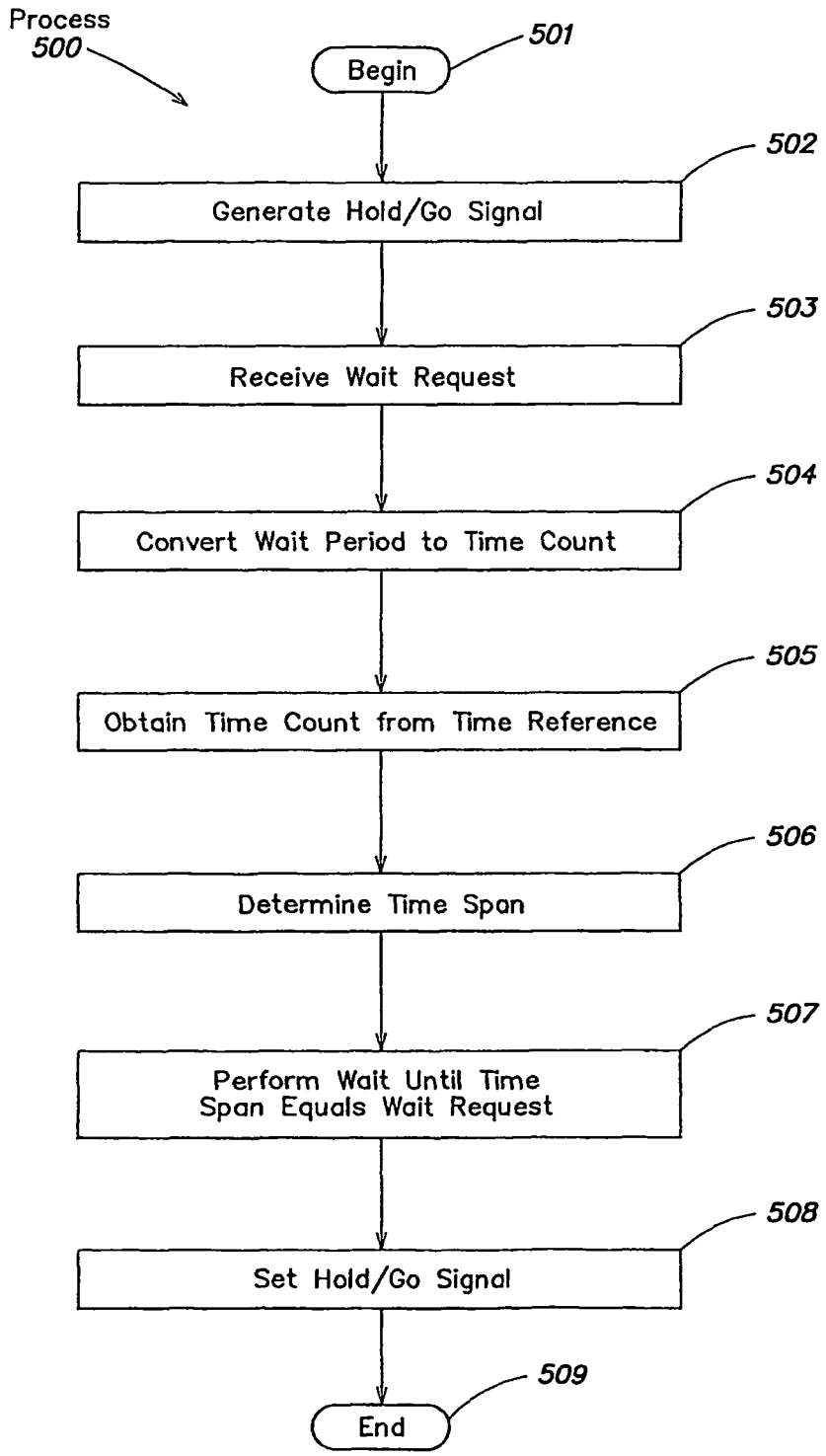
FIG. 5 is another process for performing deterministic processing according to another embodiment of the present invention.

FIG. 5 shows a process 500 for performing deterministic operations according to one embodiment of the present invention. One or more acts associated with process 500 may be performed, for example, by one or more elements of system 400 described above with reference to FIG. 4.

At block 501, process 500 begins. At block 502, a hold/go signal is generated that can be monitored by an external entity (e.g., entity 402). More specifically, the hold/go signal may be generated by the deterministic engine. According to one embodiment, the hold/go signal functions as an indicator to external entities to control the timing of processing by the external entity.

At block 503, the deterministic engine receives a wait request from an external entity. The wait request may specify a specific amount of time after which the hold/go signal changes state. At block 503, the deterministic engine converts the wait period to a time count unit. The deterministic engine obtains time count values from the time reference at block 505, and determines elapsed time (e.g., time span) at block 506 based on the time count values.

The deterministic engine enters a wait state at block 507 and remains in this state until the elapsed time is greater than or equal to the wait request, after which the hold/go signal is set at block 508. At block 509, process 500 ends.

According to one specific embodiment of the present invention, the processor may include, for example, a computer capable of performing the following tasks:
1. Generate (e.g., by a deterministic engine 406) a hold/go signal (e.g., signal 404) that can be monitored by external entities (e.g., external entity 403).
2. Receive a wait request (e.g., signal 405) from an external entity. The wait request indicates a specific amount of time after which the hold/go signal changes state.
3. Convert the requested wait period from time units to its equivalent in time count units.
4. Obtain time count values from the time reference (e.g., via the interface).
5. Apply the delta time function using two values of the time count to determine the time span associated with the difference between the two time count values.
6. Execute the deterministic loop algorithm defined as:
   a. Receive a wait request
   b. Convert requested time period into time count units
   c. Clear hold/go signal
   d. Obtain an initial time count
   e. Perform block below until the delta time result is greater than or equal to (>=) the wait request

```
{
    Obtain a current time count
    Apply delta time function to current − initial time count
}
Set hold/go signal
```

If an inverse delta time function is available, an alternative version of the deterministic loop algorithm according to another embodiment may be implemented as shown below:
   a. Receive wait request
   b. Convert requested time period into time count units
   c. Clear hold/go signal
   d. Apply inverse delta time function to wait request
   e. Perform block below while inverse delta time result>current time count

```
{
    Obtain the current time count
}
Set hold/go signal
```

Execution of the deterministic loop algorithm in the processor takes a certain amount of time which is dependent on how fast the processor can execute the algorithm. This amount of time is referred to herein as the deterministic loop algorithm overhead.

The deterministic loop algorithm overhead includes two elements: a setup overhead and a loop overhead. The setup overhead is dependent on the implementation of the processor system and pertains to the initialization instructions preceding the loop that retrieves new values of the time count. The loop overhead is the time the processor takes to execute one iteration and includes the interface overhead which may not be related to the processor system if the timing reference is external to the processor.

Both the setup overhead and loop overhead (and consequently the deterministic loop algorithm overhead) according to one embodiment are required to be predictable for any implementation of the processor and of the deterministic loop algorithm. For any particular implementation of the processor and of the deterministic loop algorithm, the difference between the minimum and maximum values of the setup overhead is referred to herein as the setup jitter. Similarly, the difference between the minimum and maximum values of the loop overhead is referred to as the loop jitter and includes the interface jitter. The total system jitter reflects the total effect of both setup jitter and loop jitter in a given implementation.

For any implementation of the system previously described, it is possible to change the state of the hold/go signal within the period of time requested in the wait request with an accuracy equal to the total system jitter, provided that the period of time requested in wait request is greater than or equal to time resolution+setup overhead+loop overhead+set hold/go signal transition time.

The external system sends a wait request to the deterministic engine and then waits for the hold/go signal to be asserted. The amount of time required for the wait request to reach the deterministic engine is known as the wait request delay. According to one embodiment of the present invention, the wait request delay is required to be predictable for any implementation of a user of the deterministic engine. Similar to other delays previously described, there is also a wait request jitter associated with the signaling of a wait request. If the wait request delay is known to the external system, it may compensate for the delay through mathematical manipulation of the period of time being sent through wait request.

The amount of time required for the hold/go signal to reach the external system is known as the hold/go signal delay. According to one embodiment of the invention, the hold/go signal delay is required to be predictable for any implementation of a user of the deterministic engine. Also similar to other delays previously described, there is also a hold/go signal jitter associated with the hold/go signal.

The amount of time the external system takes to respond to a change of state of the hold/go signal is referred to herein as the system reaction latency. According to one embodiment, the system reaction latency is required to be predictable for an implementation of a user of the deterministic engine (e.g., external entity 403). Similar to other delays previously described, there is also a system reaction jitter associated with the system reaction latency.

The accuracy a user of the deterministic engine can achieve for a given wait request is equal to the total system jitter+system reaction jitter, provided that the minimum wait request period is greater than time resolution+setup overhead+interface delay+set hold/go signal transition time+system reaction latency.

An application of the deterministic engine according to various embodiments can be found, for example, in the software automated test equipment (ATE) area, and may be used to force test functions to take a very precise and pre-defined period of time. The deterministic accuracy of existing automated test equipment software is in the many tenths of microseconds at best. According to one embodiment of the present invention, a software implementation of a deterministic engine with a relatively small total system jitter and small system reaction jitter and minimum delays and overheads can provide significant improvement in the deterministic behavior of ATE software.

According to one embodiment of the present invention, the deterministic engine described above may be implemented using the well-known Intel PENTIUM IV processor available from the Intel Corporation, Santa Clara, Calif. The Intel PENTIUM class of processors includes an embedded time reference with a relatively high resolution and very short delays associated with its access. This embedded time reference is referred to as a Time-Stamp Counter (TSC).

The TSC is a counter that accumulates the number of processor clock cycles that have occurred since initialization of the counter. The PENTIUM processor clock frequency can be considered fixed (under certain conditions) which means that the time reference resolution is constant and equal to 1/processor frequency. For instance, a PENTIUM IV processor running at a nominal frequency of 3.0 GHz provides a time reference resolution of 333 ps.

Furthermore, the contents of the TSC can be read with a single processor instruction (RDTSC). This means that the interface delay would be the execution time of that single instruction, which on a PENTIUM IV processor running at 3.0 GHz is in the order of 40 ns. For this same processor, the interface delay jitter is in the order of 3 ns.

The particular implementation outlined above using a PENTIUM IV processor has an approximate deterministic loop algorithm overhead of 356 ns, a setup overhead of 312 ns, and a loop overhead of 44 ns. Because of the PENTIUM IV processor's internal architecture, where instruction pipelines are used at large, a typical actual measured total system jitter value is not detectable.

According to one embodiment, operations performed by the deterministic engine may be performed by a software program executing on a general purpose computer system. For example, various aspects of the present invention may be implemented in one or more software programs. In one specific example, the deterministic engine may be embodied in a single class referred to hereinafter as SMX_Timing. The following sections describe one implementation of such a class. It should be appreciated that the following methods are provided by way of example only, and that the invention is not limited to any particular method or combination of methods thereof.

Basic Operation

The SMX_Timing class may be implemented as an include file (e.g., SMX_Timing.hxx) and a supporting DLL (e.g., SMX_Timing.xyz where 'xyz' can be 'dll' program in Windows programming environment or 'rsl' program in the INtime programming environment). The include file contains the class description including the implementation (as inline methods) of the time critical methods. The DLL file may provide utility methods including a class calibration routine.

At load time, the SMX_Timing DLL performs the class calibration and determines the CPU frequency. According to one embodiment, the calibration process executes automatically and the process is not necessary to execute again unless the CPU clock changes. The clock should not change unless, for example, a CPU protection mechanism uses speed throttle to reduce power dissipation.

Once the class is calibrated and the CPU frequency is determined, new class objects can be created and any of the available utility methods can be used. Because the calibration process is very important, its success should be checked before instantiating any object of the class or using most of the utility functions available in the DLL. The validation of the calibration process can be easily performed, for example, by calling a static class method (e.g., referred to below as the IsInitialized method). The usage of such a method along with all other example routines is described with more particularity below.

SMX_Timing Class Methods

According to one embodiment, time critical methods in the class are implemented in assembly language and as inline functions due to performance reasons. Because of their simplicity, key methods are described below.

SMX_Timing (Void)

According to one embodiment, objects created in the timing class includes its own calibration factors. A timing class constructor copies global calibration factors into the object so the object can be modified on a per object basis if necessary.

SMX_U64 Start (Void)

The Start method reads the current timestamp counter and saves the counter value into a marker attribute. The marker attribute may be used as a reference to compute the elapsed time (e.g., using a method referred to as the Elapsed method) or to wait until a specified amount of time has passed (using a method referred to as the WaitUntil method). The following example code implements the described functionality:

```
1.    xor       eax,eax
2.    cpuid                      ; sync
```

```
3.     ;
4.     rdtsc                           ; read CPU counter into edx:eax
5.     ;
6.     mov     ecx,this
7.     ;
8.     mov     [ecx+marker+0],eax      ; save marker
9.     mov     [ecx+marker+4],edx
```

The code specified above functions as follows: lines 1 and 2 synchronize the CPU: all instructions being executed are finished before the timestamp counter is sampled on line 4; line 6 retrieves the pointer to the current object data area; lines 8 and 9 save the timestamp into the marker attribute. On exit, the method returns an unsigned 64-bit value representing the timestamp counter in CPU clock ticks.

SMX S64 Elapsed (Void)

The Elapsed method computes the difference between the current timestamp and the one sampled by the last time the Start method was called. An optional calibration factor may be present to allow the removal of any desired overhead. The implementation of the Elapsed method is demonstrated by the following example code:

```
1.     xor     eax,eax
2.     cpuid                           ; sync
3.     ;
4.     rdtsc                           ; read counter
5.     ;
6.     mov     ecx,this
7.     ;
8.     sub     eax,[ecx+marker+0]      ; compute elapsed time
9.     sbb     edx,[ecx+marker+4]
10.    ;
11.    sub     eax,[ecx+eCF+0]         ; apply calfactor
12.    sbb     edx,[ecx+eCF+4]
```

The previous code is very similar to the Start method having as the only differences the lines 8 and 9, where the difference between the just sampled timestamp and the one saved as marker is computed, and lines 11 and 12 that subtract the calfactor stored in the attribute eCF. The computed result is returned by the method as a signed 64-bit value (the value returned can be negative depending on the calibration factor).

In the class initialization process (e.g., when the DLL is loaded or when the method CalibrateTiming is called), the computed call factor is the existing overhead between calling the methods Start and Elapsed back to back. The calibration factor is such that the returned value by the Elapsed method in the following code sequence is zero:

```
       t->Start( );
       SMX_U64 x = t->Elapsed( ); // here x = 0
```

Using a default calibration factor is a good way to compute how long an operation takes. A call may be added to the method Start before and another call to method Elapsed after the operation as shown in the following example:

```
       ...
       t->Start( );
       // do some work here
       printf ("Testing...\n");
```

```
       //
       SMX_U64 x = t->Elapsed( ); // here x = time spent printing...
       ...
```

If the default calibration factor is not satisfactory, the method SetElapsedCalFactor can be called to change the calibration factor.

SMX_U64 WaitUntil (SMX_U64 Delta)

The WaitUntil method is one example routine to implement the waste function described above. The example method computes a forward delta from the last time the Start method was called and waits in a tight loop until the timestamp equals or exceeds the computed end time.

Two changeable options are recognized by this example method: a calibration factor to adjust the execution time (average loop error), and an enable flag that enables/disables the method, depending on its value. The calibration factor can be altered by the method SetWaitUntilCalFactor, and the enable flag can be changed using the Enable and Disable methods. According to one embodiment, the default value for the enable flag is false (the WaitUntil method is disabled).

The following example code implements the WaitUntil method:

```
1.     xor     eax,eax
2.     cpuid                           ; sync
3.     ;;;;;;;;;;;;;;;;;;;;;;;;;
4.     mov     edx,this                ; this is necessary!
5.     ;;;
6.     lea     eax,delta               ; retrieve the 'delta'
                                         parameter
7.     mov     ecx,[eax]               ; ebx:ecx = delta
8.     mov     ebx,[eax+4]
9.     ;;;
10.    movzx   eax,isEnabled           ; check if method is enabled
11.    or      eax,eax
12.    cmovz   ecx,eax                 ; if not, ebx:ecx=0 ->
                                         don't loop!
13.    cmovz   ebx,eax
14.    ;;;
15.    xor     eax,eax                 ; use eax to zero registers
16.    ;;;
17.    sub     ecx,[edx+wCF+0]         ; ebx:ecx = delta – calfactor
18.    sbb     ebx,[edx+wCF+4]
19.    ;;;
20.    cmovc   ecx,eax                 ; if (delta–calfactor) < 0,
                                         ebx:ecx = 0!
21.    cmovc   ebx,eax
22.    ;;;
23.    add     ecx,[edx+marker+0]      ; ebx:ecx = marker +
                                         delta – calfactor
24.    adc     ebx,[edx+marker+4]
25.    ;;;;;;;;;;;;;;;;;;;;;;;;
26. lb10: rdtsc                        ; read CPU timestamp into
                                         edx:eax
27.    sub     eax,ecx
28.    sbb     edx,ebx                 ; edx:eax =CLK–
                                         (marker+delta)=loop error
29.    jc      lb10                    ; loop while negative error
```

The listed code works as follows: lines 1 and 2 synchronize the execution flow; line 4 retrieves a pointer to the current object (this); lines 6 to 8 load the requested wait period; lines 10 and 11 check if the method is enabled or not; lines 12 and 13 change the requested period to zero if the method is not enabled; lines 17 and 18 subtract the programmed calibration factor from the requested wait period; lines 20 and 21 adjust the previous calculation to zero in case the result is negative; lines 23 and 24 compute the final timestamp; and finally the loop on lines 26 to 29 wait until the computed timestamp is reached. The returned value is an unsigned 64-bit value representing the loop error measured in CPU clock ticks.

At the calibration time, the WaitUntil method is exercised with a varying delta value. This procedure leads to two interesting numbers: the minimum time the method takes to execute (overhead) and the loop error. The default calibration factor is the sum of the overhead and half the value of the loop error.

To use the WaitUntil method as proposed above, the following example code can be implemented:

```
...
t->Start( );
RunCodeHere( );
t->WaitUntil(computedDelay);
...
```

In the above example, if the time equivalent to computedDelay is larger than the largest execution time of the function RunCodeHere, the above excerpt is a deterministic operation $O_D$ as described above. On the other hand, if the execution time of the function RunCodeHere is larger than the time equivalent of the value computedDelay, the operation is not deterministic and the envelop around the function RunCodeHere performed by the Start and WaitUntil methods is useless. Below are listed ways of determining the value computedDelay to make the above code deterministic.

SMX_U64 WaitUntilEx (SMX_U64 Delta)

Contrary to the WaitUntil method, an example method referred to herein as WaitUntilEx method uses the operating system (e.g., the Windows or INtime operating system functions) to aid in wasting time. Such a method may be used to allow the developer to wait for long periods of time (e.g., 100 milliseconds) permitting the operating system some time to do its work such as moving the mouse, exchanging packets over the network, etc., while still keeping control of the spent time. Using the example WaitUntil method above, the tight loop waiting for the right timestamp locks the CPU and no apparent activity exists, giving the user a false impression that the CPU hanged.

The example WaitUntilEx method splits the time to waste into two parts: the first part is wasted by the operating system using one of its sleep functions (e.g., the Sleep function in the Windows case and the knRtSleep function in the INtime case); the second part may be wasted by the WaitUntil method to provide a good control over the total time spent. The return value is the loop error returned by the WaitUntil method.

SMX_U64 Wait (SMX_U64 clks)

This method may be implemented as, for example:

```
Start( );
return WaitUntil(clks);
```

The method Wait simply waits for the specified number of clocks (clks) to be wasted. The returned value is the loop error returned by the WaitUntil method.

SMX_U64 WaitEx (SMX_U64 clks)

This method may be implemented as, for example:

```
Start( );
return WaitUntilEx(clks);
```

The method WaitEx waits for the specified number of clocks (clks) to be wasted. The returned value is the loop error returned by the WaitUntilEx method.

SMX_U64 GetElapsedCalFactor (Void)

This example method returns an unsigned 64-bit value representing the number of CPU clock ticks being used as calibration factor by the Elapsed method.

Void SetElapsedCalFactor (SMX_U64 newCF)

This method sets the calibration factor used by the Elapsed method to the unsigned 64-bit value passed as a parameter. The parameter is expected to be in CPU clock ticks.

Void ResetElapsedCalFactor (Void)

The ResetElapsedCalFactor method recovers the original calibration factor used by the Elapsed method. The current calibration factor is lost.

SMX_U64 GetWaitUntilCalFactor (Void)

This method returns an unsigned 64-bit value representing the number of CPU clock ticks being used as calibration factor by the WaitUntil method.

Void SetWaitUntilCalFactor (SMX_U64 newCF)

This method sets the calibration factor used by the WaitUntil method to the unsigned 64-bit value passed as a parameter. The parameter is expected to in CPU clock ticks.

Void ResetWaitUntilCalFactor (Void)

The ResetWaitUntilCalFactor method recovers the original calibration factor used by the WaitUntil method. The current calibration factor is lost.

SMX_U64 GetCPUFrequency (Void)

This static method returns the CPU frequency in Hertz, found in the calibration process. The returned value is an unsigned 64-bit number.

SMX_U64 GetKernelTickClk (Void)

The static method GetKernelTickClk returns an unsigned 64-bit number representing the number of CPU clock ticks equivalent to one kernel tick. In the Windows operating system, the kernel tick is 10 ms and in the INtime environment, the kernel tick can be one of the following values: 100 us, 200 us, 250 us, 500 us, 1 ms, 2 ms, 5 ms, and 10 ms.

Bool IsInitialized (Void)

This static method may be used for verification of the calibration result. If the calibration fails, the class objects may present erratic behavior and should not be used. The method returns true if the last calibration was adequate and false otherwise.

Void Enable (Void)

This static method sets the attribute enabled to true. The attribute may be used by the WaitUntil method to enable/disable its functionality. When running in the INtime environment, this method also stops the kernel scheduler. According to one embodiment, the WaitUntil method is disabled by default.

Void Disable (Void)

This static method resets the attribute enabled to false. The attribute is used by the WaitUntil method to enable/disable its functionality. See the WaitUntil method description for more information. When running under the INtime environment, this method also restarts the kernel scheduler. According to one embodiment, the WaitUntil method by default.

Bool IsEnabled (Void)

This static method verifies the status of the method WaitUntil and returns true if it is enabled and false otherwise.

SMX_U64 GetLoopError (Void)

As can be seen above in the example code listing of the WaitUntil method, the loop on lines 26-29 finishes as soon as the timestamp counter equals or exceeds the value (marker+delta−calfactor) by a loop error. During calibration, the Wait- Until method may be exercised with various values for the delta parameter, resulting in a spectrum of values for the loop error.

This static method returns an unsigned 64-bit number representing the maximum loop error, in CPU clock ticks, found in the calibration process.

SMX_U64 GetWaitUntilOverhead (Void)

This method returns an unsigned 64-bit value representing the number of CPU clock ticks found as the minimum execution time the WaitUntil method takes to execute.

Void DisableAllInterrupts (Void)

This static method disables all interrupts saving the currently-enabled interrupts. It may be used to guarantee that no external event affects the deterministic behavior of the program being executed. Interrupts can be restored using the method RestoreInterrupts before any I/O operation or operating system call.

Void RestoreInterrupts (Void)

This static method enables the interrupts that were active when the above DisableAllInterrupts method was called.

Bool CalibrateTiming (Void)

This static method runs the calibration process, determining the calibration factors used by the Elapsed and WaitUntil methods as well as the CPU frequency. If the method returns true, the calibration succeeded; otherwise the method returns false.

SMX_U64 Clk2Time (SMX_U64 clks, enum TimeUnits Unit)

This is a static method used to convert CPU clock ticks to time in the specified time unit. Available time units are, for example, second (SEC), millisecond (MILLISEC), microsecond (MICROSEC), nanosecond (NANOSEC) and picosecond (PICOSEC).

SMX_U64 Time2Clk (SMX_U64 Time, enum TimeUnits Unit)

This is a static method used to convert time in the specified time unit to CPU clock ticks. Available time units are, for example, second (SEC), millisecond (MILLISEC), microsecond (MICROSEC), nanosecond (NANOSEC) and picosecond (PICOSEC).

Void FlushCaches (Void)

This is a static method that may be used to flush all caches. The method may be used before benchmarking to promote the worst-case scenario.

Example Steps for Creating a Deterministic Driver

Creating a deterministic driver is a process that generally requires many time measurements and is generally a time-consuming operation. Each API that is exposed should be timed while exercised with different parameters. To assist a software developer to design a deterministic driver, a process for creating a deterministic driver including several guidelines is described below.

Step 1—Algorithm Selection

At the development process, the driver writer has to be very careful in selecting algorithms. Because creating a deterministic driver involves adding some "cushion" on its execution time to compensate for variations, selecting a stable and fast algorithm is important.

Create execution paths with similar if not identical execution times. This is called balanced execution. This method is usually difficult to implement but it is worth it if it can be accomplished. One example to illustrate this balanced execution technique is shown below:

```
Instead of using:          Use:
int x = 2;                 int x;
if (a < b)                 if (a < b)
{                          {
    x = 5;                     x = 5;
}                          }
                           else
                           {
                               x = 2;
                           }
```

In the preceding example, if there is a strong tendency in the comparison, like a usually being greater than or smaller than b (unbalanced execution time), then this method has no practical effect and the execution time optimization should be a priority:

```
If a usually is less than b:        if b usually is less than or equal a:
int x = 2;                          int x = 5;
if (a < b)                          if (b <= a)
{                                   {
    x = 5;                              x = 2;
}                                   }
```

Yet another technique for providing balanced execution includes removing if statements completely. The same operation above can be implemented as, for example:

```
int x = 5 & (−int(a < b)) | 2 & (−int (b <= a));
```

Even being a little bit more complicated than the preceding cases, the above solution has a uniform execution time and has no branches. Note that when conditional branches are used, like when if statements are employed, there is a penalty in the execution time every time the condition fails.

Step 2—Execution Time Analysis

Once the algorithm is selected carefully, it is time to analyze its execution time according to the input parameters. The following two examples show how the input of an API can affect its execution time in different ways:

```
int func1 (int x)          int func2 (int x)
{                          {
    return x + 2;              int value = 0;
}
                               for (int i = 1; i <= x; i++)
                               {
                                   value += i;
                               }
                               return value;
                           }
```

A logical analysis of the preceding functions indicates that func1 should have a constant execution time that is independent of its input, while func2 should have a variable execution time that strongly depends of its input. Functions like func1 are referred to herein as Simple Functions while functions like func2 are referred to as Complex Functions.

When the execution time of a given routine is not affected significantly by the change of its inputs, it is more convenient to treat the routine as a simple function. For instance, if the preceding function func2 is called only with values less than 10, modeling its execution time as a simple function is very convenient. Note that func2 behaves as a simple function for inputs less than or equal zero, and should increment its execution time linearly when x increases.

Step 3—Benchmarking

Unfortunately, a simple logical analysis of the function behavior is not enough to determine its execution time. On the other hand, the analysis is important to design the right benchmarking procedure. As shown in the previous section, simple functions do not need to have its stimuli changed while complex functions do. A few sample benchmark routines appear below.

Benchmarking Simple Functions

Benchmarking simple functions can be performed by a routine like the one listed below. Note that because the input parameter is not important, any valid parameter can be selected.

```
1.    SMX_Timing::Disable( );
2.
3.    for (int j = 0; j < MAX_SAMPLES; j++)
4.    {
5.        SMX_Timing::FlushCaches( );
6.        t0->Start( );
7.        // add here the operation to be timed
8.        t->Start( );
9.        result = func1(anyValidValue);
10.       t->WaitUntil(anyValue);
11.       // end of operation
12.       samples[j] = t0->Elapsed( );
13.   }
```

The execution of the preceding benchmark routine proceeds as follows: line 1 disables the WaitUntil method (and the deterministic engine) so the deterministic operation $O_D$ formed by lines 8, 9 and 10 becomes a regular operation (non-deterministic). Because the WaitUntil method is disabled, the anyValue value is not important.

Line 5 flushes all caches (code and data) to cause the worst case in the execution time; lines 6 and 12 measures the time to execute the function fund and its deterministic envelope formed by lines 8, 9 and 10. Note that t0 is measuring the total time spent by the deterministic operation $O_D$ formed by lines 8, 9 and 10.

Because the deterministic engine is disabled, the values measured in line 12 correspond to the execution time of function func1 plus a small overhead intrinsic to the deterministic engine (E on equations (2) and (3) above).

After the execution of the preceding code fragment, a maximum value can be searched in an array of samples. According to one embodiment, execution time samples in an array so that statistical analysis may be performed on the collected data. In particular, checking peak-to-peak execution time variation (jitter) and the average execution time provides a better understanding of the function behavior or it may point to an error in the analysis performed previously.

Once the maximum value for the execution time of the function being benchmarked is defined, the variable computedDelay can be defined and the following example code excerpt can be run to confirm the predicted behavior:

```
1.    SMX_Timing::Enable( );
2.
3.    for (int j = 0; j < MAX_SAMPLES; j++)
4.    {
5.        t0->Start( );
```

-continued

```
6.        t->Start( );
7.        result = func1(j);
8.        t->WaitUntil(computedDelay);
9.        samples[j] = t0->Elapsed( );
10.   }
```

Plotting the samples array should result in a flat line with minor variations, if any. One point to be remembered is that there is an intrinsic error in the method WaitUntil and errors in the range of the loop error are expected. To determine the loop error value, the developer can call the method GetLoopError as explained above. Note that in the previous example, function func1 was called with a variable argument j just as a safety measure to check if the original analysis was correct.

Benchmarking Complex Functions

Complex functions are more complicated to benchmark as expected. In the sample function func2 listed above, a 2-dimensional matrix needs to be created. One dimension represents the possible input values (x values), and the other dimension represents the samples taken for that particular input value (fixed x). Because func2 has only one dependence (x parameter), a matrix may be created having two dimensions. In general, one dimension is created for each dependent variable and one extra for the samples taken when all variables are fixed. The following listing as an example of benchmarking routine for function func2:

```
1.    SMX_Timing::Disable( );
2.
3.    for (int j = 0, idx = 0; j < MAX_SAMPLES; j++)
4.    {
5.        for (int i = MIN; i < MAX; i+=STEP, idx++)
6.        {
7.            SMX_Timing::FlushCaches( );
8.            t0->Start( );
9.            t->Start( );
10.           result = func2(i);
11.           t->WaitUntil(anyValue);
12.           samples[idx] = t0->Elapsed( );
13.   }
```

The main difference between the above listing and the one used for a simple function is the fact that another for loop was added to vary the input x of function func2. The stimuli do not need to cover the whole range of possible values but should exercise all execution paths in the function under benchmark. Because func2 has a different behavior when the input parameter is less than or equal zero and when it is positive, the preceding benchmark routine should have the value of MIN set to something less than zero and the value of MAX above zero. The right (minimum) number of points per execution path depends on the function and the developer needs to perform the benchmarking until a behavioral pattern is observed in the execution time.

Because the function has a maximum for every x value, the developer has two options: create a table that relates every possible input x to the maximum value found for that particular input, or create a function that represents the execution time versus the input x. The first option is not always possible because the input span can be huge and it is not feasible to fit the table in memory. The second option is more complicated to implement but usually the method to use.

From the preceding analysis we guessed that the function func2 had a constant execution time for values of x less than or equal zero and a ramp for increasing values of x. A function to model this behavior could be:

```
1.   SMX_U64 executionTime (int x)
2.   {
3.        SMX_U64 ns = A * (x & (-int(x > 0))) + B;
4.        SMX_U64 clkTicks = SMX_Timing::Time2Clk(ns,
5.                                  SMX_Timing::NANOSEC);
6.        // returns value in clock ticks
7.        return clkTicks;
8.   }
```

The function above executes as follows: if x is less than or equal zero the logical operation evaluates to 0 and the executionTime function returns B ns. If the value of x is greater than zero, the execution time is incremented by A ns per unit of x. For instance, if x is set to 100, the execution time will be (100*A+B) ns. The values of A and B are determined after the benchmark is executed. Note that the WaitUntil method expects a value in clock ticks to execute, so the conversion to clock ticks is performed in the executionTime function calling the method Time2Clk. The benchmark routine may be changed to take into account the new architecture. The variable anyValue may be substituted by the function call as shown below:

```
1.   SMX_Timing::Disable( );
2.
3.   for (int j = 0, idx = 0; j < MAX_SAMPLES; j++)
4.   {
5.        for (int i = MIN; i < MAX; i+=STEP, idx++)
6.        {
7.             SMX_Timing::FlushCaches( );
8.             t0->Start( );
9.             t->Start( );
10.            result = func2(i);
11.            t->WaitUntil(executionTime(i));
12.            samples[idx] = t0->Elapsed( );
13.       }
14.  }
```

Note that with the new function call to compute the execution time, the overall execution is increased. That fact does not affect the deterministic operation $O_D$ other than increasing its execution time because the executionTime function is called before the WaitUntil method acts.

Now that the developer has a benchmark routine, the values of A and B can be defined. One goal is to create a pair of values that when replaced in the function executionTime, the result returned by that function is always higher than the actual execution time (the non-deterministic time). To confirm that the selected pair of values satisfies this goal, the benchmark routine may be executed again in a similar way to what was performed for the simple function func1.

It may be noted that the time calculated in the executionTime function was explicitly computed in ns and then converted to clock ticks. It is because, according to one embodiment, that one of the desired characteristics of an ATE system is correlation.

When two systems are compared, one of the inevitable differences is the CPU clock frequency. Even if the specification matches, the effective speed of each CPU will vary. Even more, because it is necessary to keep execution time constant over the lifetime of the test application, natural computer upgrades will be necessary due to many factors like malfunction and installed base expansion. With that in mind, the developer can understand why having execution time measured in clock ticks is not a good idea.

Step 4—Assembling a Timing Table

In the SMX architecture, every driver has at least one timing table. In theory, one timing table must be created for every different computer shipped to the customer.

A timing table is implemented as a DLL that carries the data table, execution time models (timing functions) to represent the timing behavior of complex functions and some standard functions to report information about the timing table.

The data table according to one embodiment is an array where each element is represented by the following example structure:

```
struct SMX_TimingTableEntry
{
     void *pFunc;
     SMX_U64 time;
     enum SMX_Timing::TimeUnits unit;
     SMX_U64 clockTicks;
};
```

In the above example structure, pFunc is a void pointer that has the address of the timing function used by complex functions; time has the execution time used by simple functions; unit is the unit used by the field time; and clockTicks contains the result of the conversion of the pair (time, unit) to the current CPU clock speed. Note that this conversion process occurs only once when the DLL is loaded.

The timing functions can have any number of parameters but they should, in one example, return the execution time in clock ticks. In fact, if possible, the timing function could be fast because the function is used very often. In a real driver, the executionTime function listed above may be more useful and faster if the function were implemented similar to the following:

```
static const SMX_U64 A_time = <some value>;
static const SMX_U64 B_time = <some value>;
static SMX_U64 A = 0;
static SMX_U64 B = 0;
static SMX_U64 executionTime (int x)
{
     return A * (x & (-int(x > 0))) + B;
}
```

Here, values A and B are converted from time to clock ticks at the DLL load time. Using this method, the conversion process, which is time consuming, can be performed once.

The following timing table represents an example where one simple function and one complex function are listed.

```
struct SMX_TimingTableEntry timingTable [ ] =
{
     //function address    time              unit              clock ticks
     /////////////////////////////////////////////////////////
     {       0,            500, SMX_Timing::NANOSEC,   0}, // 0
     { executionTime,      0,   SMX_Timing::NANOSEC,   0} // 1
};
```

The timing table DLL can include three routines to provide information about the timing table. They are can be constant and can be similar to the following:

```
extern "C" __declspec(dllexport) struct SMX_TimingTableEntry
                                    *SMXGetTableAddress (void)
{
    return timingTable;
}
extern "C" __declspec(dllexport) int SMXGetElementSize (void)
{
    return sizeof SMX_TimingTableEntry;
};
extern "C" __declspec(dllexport) int SMXGetNumberOfElements (void)
{
    return sizeof timingTable / sizeof SMX_TimingTableEntry;
};
```

The first routine returns the timing table address, the second returns the timing table element size and the last returns the number of elements found in the timing table.

As a standard procedure, the DLL main (SMX_DLL_MAIN) contains code necessary to convert to clock ticks all constants representing time. The following listing illustrates an implementation for that:

```
#pragma warning (disable:4100)
extern "C" BOOL __stdcall SMX_DLL_MAIN
(SMX_DLL_HANDLE module, DWORD reason,
                    LPVOID reserved)
{
    switch (reason)
    {
        case SMX_DLL_PROCESS_ATTACH:
            for (int i = 0; i < SMXGetNumberOfElements( ); i++)
            {
                timingTable[i].clockTicks = SMX_Timing::Time2Clk
                    (timingTable[i].time, timingTable[i].unit);
            }
            A = SMX_Timing::Time2Clk
            (A_time, SMX_Timing::<SOME_UNIT>);
            B = SMX_Timing::Time2Clk
            (B_time, SMX_Timing::<SOME_UNIT>);
            break;
        case SMX_DLL_THREAD_ATTACH:
        case SMX_DLL_THREAD_DETACH:
        case SMX_DLL_PROCESS_DETACH:
            break;
    }
    return TRUE;
}
#pragma warning (4:4100)
```

There may be defined a class defined in the SMX_Timing project that helps the developer manage timing tables. The class name is SMX_TimingTableManager and can be inherited by the driver to be used.

```
        public:
            SMX_TimingTableManager (void);
            ~SMX_TimingTableManager (void);
            //
            virtual bool IsInitialized (void) { return ttm_init; };
            virtual SMX_TimingTableInfo
                *GetCurrentTimingTableInfo(void){return
pCurrent;};
            virtual bool UpdateDriverTiming (void) { return true; };
            //
            virtual bool UseTimingTable (char *name = 0);
            virtual SMX_U64 GetTimingTableValue (int index);
            virtual SMX_U64 (*GetTimingTableFunction
            (int index))(...);
        };
```

Deterministic Engine Applications

One application of a deterministic engine according to one embodiment is to provide deterministic behavior in systems that are, by design, non-deterministic in terms of time. As discussed, computer systems using the Intel PENTIUM class of processors are by design non-deterministic. The PENTIUM processor uses several levels of pipelining, branch prediction algorithms and internal cache memory that causes the execution time of any particular set of instructions dependent on the current "context" of the processor (i.e., what instructions are being decoded at each pipeline level, the contents and arrangement of the internal cache memory, etc). This makes impossible to define a priori the exact execution time any particular set of instructions. What can be defined is the maximum execution time. This makes systems based on PENTIUM-type processors predictable but not deterministic.

According to one embodiment of the present invention, a deterministic engine can make the total execution time constant for any particular set of instructions, provided that the desired constant time is equal or greater than the maximum execution time. The maximum execution time can be determined either by analysis of the instructions involved (and finding out their maximum execution time) or empirically by execution the instruction set in different processor contexts.

Figure 6:
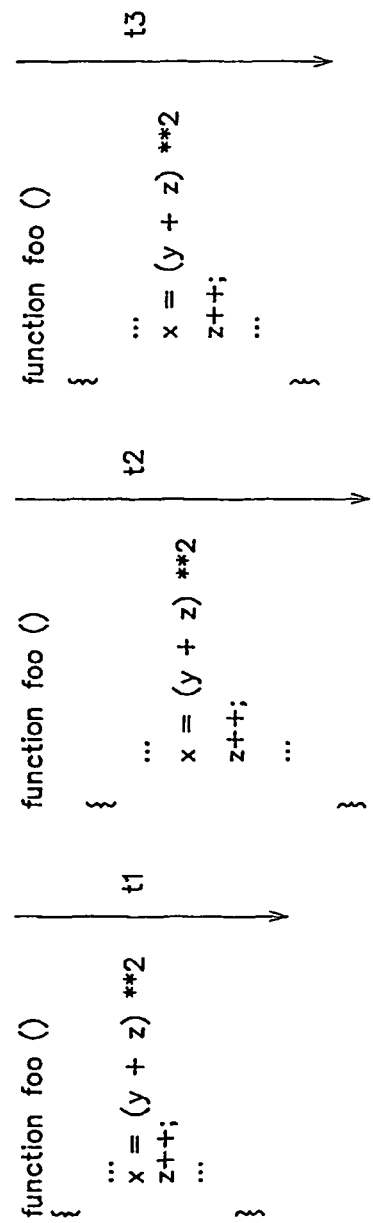
FIG. 6 shows an example execution of code by a non-deterministic system.
Figure 7:
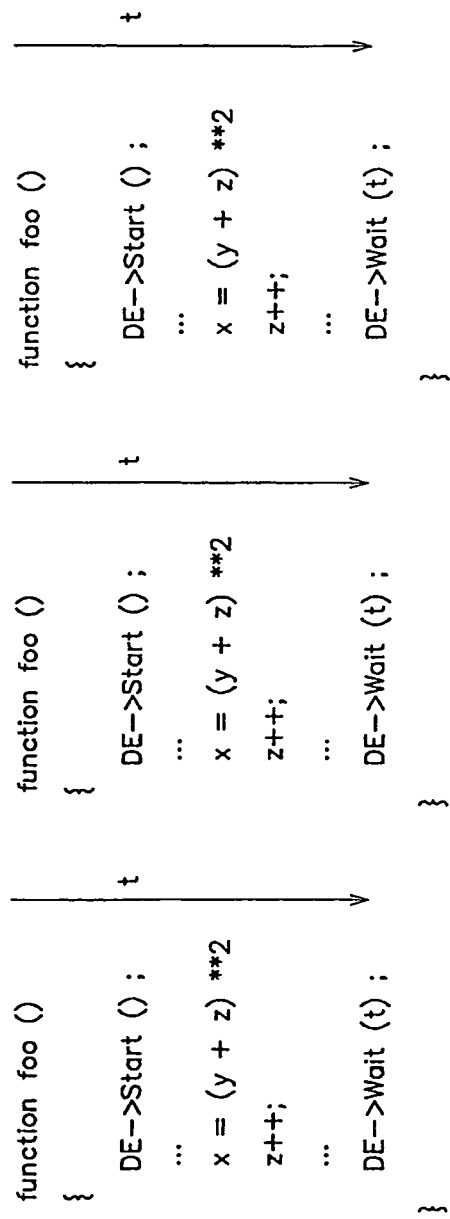
FIG. 7 shows an example execution of code by one or more deterministic systems according to one embodiment of the present invention.

The result of executing operations deterministically according to various embodiments of the present invention can be seen in FIGS. 6 and 7. FIG. 6 shows an example execution of code by a non-deterministic system. In the examples show, three executions of the same code segments are performed. These executions may be performed either by the same computer or by different computers. As shown, three different executions may result in three overall execution times, $t_1$, $t_2$, and $t_3$. A software system that requires deterministic execution could not rely on consistent execution from the computer system(s) providing the execution times shown in FIG. 6.

FIG. 7 shows example executions of code by one or more systems implementing various aspects of the present invention. In the examples shown, executions of the same code segments are preformed in the same overall execution time t. Because the execution times are constant among individual executions, operations performed by the code are repeatable.

For example, the deterministic engine may be implemented in software as a pair of C++ methods of an object called "DE" as shown in FIG. 7. The Start( )method marks the point in time where execution begins and the Wait( )method engages the deterministic engine until time t elapses. This ensures that the total execution time for this set of instructions will be always constant and equal to t.

The deterministic engine has many applications in environments where being able to ascertain execution time in advance is more desirable than execution speed. This feature is a common trait of systems in the semiconductor automated test equipment (ATE) industry, particularly in the case of linear (analog) and mixed-signal device test. In such systems, a number of different inputs are provided to the device under test (DUT) and measurements are made on the response of the DUT to those inputs. The DUT is deemed to be functional or defective based on the measurements obtained. Because linear and mixed-signal devices generate analog signals that have to be measured, the exact point in time when the measurement is made becomes of critical importance.

Figure 8:
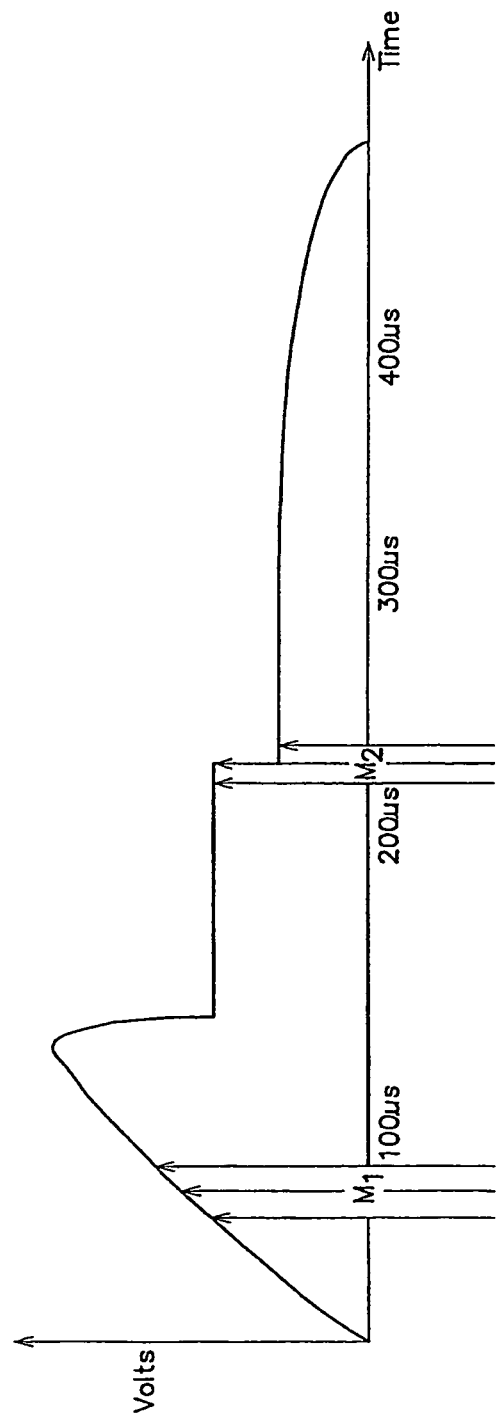
FIG. 8 shows a hypothetical device output and measurements exhibiting aspects of the present invention.

FIG. 8 shows a hypothetical device output and two measurements ($M_1$ and $M_2$) that are made to verify if the device is functional or not. If these measurements are made through software command on a non-deterministic system, there will be an imprecision (jitter) associated with the exact time the measurement is made. If the same piece of software to make the measurements is executed several times in a row (in this example, three times), $M_1$ and $M_2$ would most like indicate different values for each execution of the measurement software even if the device output is exactly the same for every run.

FIG. 8 shows that the timing jitter associated with the measurement execution causes a direct error in the measurement values. Depending on the extent of the timing jitter, the error in the measure can be potentially so great that a functional device could erroneously be deemed non-functional and vice-versa. Test applications for linear and mixed-signal devices historically had to deal with this type of problem and several solutions are available but they all involve either considerable extra test time (averaging a large number of measurements) or cost (more sophisticated measurement hardware).

If an implementation of the deterministic engine is used to control when exactly in time the measurements are made then the timing jitter would be either eliminated or extremely reduced, providing more repeatable results without a significant time penalty and possibly using less sophisticated measurement hardware.

A direct consequence of being able to specify when measurements occur in time is that the test application software becomes independent of the processor speed upon which it is running. For instance, if a test application is developed in a computer platform that runs at a certain speed (e.g., 2.0 GHz), the measurements performed by that application are indirectly tied in to that processor speed. If that test application is moved to a faster computer system (e.g., 3.0 GHz) it is very likely all measurements will be executed more quickly than intended and such faster operation will produce (once again) erroneous results. Porting an existing test application to a faster processor system can be very time consuming and costly for a system developer.

If, rather, the test application makes use of the deterministic engine, then all measurements always occur at the same pre-defined point time by definition. This implies that porting the test application to a faster processor requires no changes to the application. This feature allows the user to make improvements towards test time only for selected measurements instead of having to deal with porting the whole test application (usually with thousands of measurements).

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for performing deterministic processing, the method comprising acts of:
   executing a first instruction on a computer system in a first execution;
   measuring an execution time of the act of executing for the first execution;
   waiting a period of time to adjust the execution time of the first execution to a constant value;
   extending the execution time of the first execution to the constant value; and
   extending the execution time of a plurality of executions of the first instruction after the completion of the first execution to be a same constant value over each of the plurality of the executions.

2. The method according to claim 1, wherein the act of waiting a period of time includes waiting for a period of time after the act of executing until the constant value of execution time has elapsed.

3. The method according to claim 1, further comprising acts of measuring an execution of the first instruction and determining, based on the act of measuring, a maximum execution time of the first instruction.

4. The method according to claim 3, further comprising an act of setting the constant value to the maximum execution time.

5. The method according to claim 1, further comprising an act of determining a maximum execution time of the first instruction.

6. The method according to claim 5, further comprising an act of setting the constant value to the maximum execution time.

7. The method according to claim 1, wherein the plurality of executions occur on different computer systems.

8. The method according to claim 1, wherein the different computer systems have different processing capabilities.

9. The method according to claim 1, further comprising an act of performing the act of executing the first instruction on a computer system within a predetermined time period.

10. The method according to claim 1, further comprising an act of waiting a period of time to adjust the execution time to the constant value.

11. The method according to claim 1, further comprising an act of determining relative time.

12. The method according to claim 11, further comprising acts of providing a time reference and determining the relative time using the time reference.

13. The method according to claim 11, further comprising an act of determining the relative time based upon a counter value of processor cycles.

14. The method according to claim 1, further comprising acts of determining an amount of time used to execute the first instruction, and waiting a period of time to adjust the execution time to the constant value.

15. The method according to claim 1, further comprising an act of determining elapsed time based on a plurality of counter values.

16. The method according to claim 1, wherein the counter value is a time stamp counter of a processor.

17. The method according to claim 1, wherein the method is performed by an automated test system.

* * * * *

UNITED STATES PATENT AND TRADEMARK OFFICE
CERTIFICATE OF CORRECTION

| | | |
|---|---|---|
| PATENT NO. | : 8,719,556 B2 | Page 1 of 1 |
| APPLICATION NO. | : 13/373359 | |
| DATED | : May 6, 2014 | |
| INVENTOR(S) | : Paulo Mendes et al. | |

It is certified that error appears in the above-identified patent and that said Letters Patent is hereby corrected as shown below:

On the title page, item (73), delete "Bini Ate, LLC," and insert -- BIN1 ATE LLC --.

Signed and Sealed this
Thirtieth Day of September, 2014

Michelle K. Lee
*Deputy Director of the United States Patent and Trademark Office*